US008300628B2

(12) United States Patent
Schmidt et al.

(10) Patent No.: US 8,300,628 B2
(45) Date of Patent: Oct. 30, 2012

(54) METHOD AND SYSTEM FOR TRANSMITTING SUPPLEMENTARY DATA, AND COMMUNICATION TERMINAL

(75) Inventors: Andreas Schmidt, Braunschweig (DE); Norbert Schwagmann, Braunschweig (DE); Martin Hans, Bad Salzdetfurth (DE)

(73) Assignee: Infineon Technologies AG (DE)

( * ) Notice: Subject to any disclaimer, the term of this patent is extended or adjusted under 35 U.S.C. 154(b) by 647 days.

(21) Appl. No.: 11/622,097

(22) Filed: Jan. 11, 2007

(65) Prior Publication Data

US 2007/0160085 A1 Jul. 12, 2007

(30) Foreign Application Priority Data

Jan. 11, 2006 (DE) .................. 10 2006 001 503

(51) Int. Cl.
*H04L 12/66* (2006.01)
*H04L 12/28* (2006.01)
(52) U.S. Cl. .................. 370/352; 370/389; 370/402
(58) Field of Classification Search .......... 370/352–356, 370/389, 493, 535, 260, 402; 709/204
See application file for complete search history.

(56) References Cited

U.S. PATENT DOCUMENTS

| 5,664,007 | A   | * | 9/1997  | Samadi et al. ............. 455/442 |
| 6,330,686 | B1  |   | 12/2001 | Denny et al.                        |
| 2002/0173319 | A1 |   | 11/2002 | Fostick                             |
| 2003/0016805 | A1 | * | 1/2003  | Creamer et al. ......... 379/202.01 |
| 2003/0067887 | A1 |   | 4/2003  | Truetken                            |
| 2004/0010596 | A1 |   | 1/2004  | Hui                                 |
| 2004/0068572 | A1 | * | 4/2004  | Wu ............................. 709/229 |
| 2004/0122896 | A1 |   | 6/2004  | Gourraud                            |
| 2004/0254983 | A1 | * | 12/2004 | Ando et al. ................ 709/204 |
| 2005/0159161 | A1 | * | 7/2005  | Florkey et al. ............ 455/450 |
| 2006/0007900 | A1 | * | 1/2006  | Sylvain ..................... 370/338 |
| 2007/0140217 | A1 | * | 6/2007  | Benco et al. ............... 370/352 |
| 2008/0117893 | A1 | * | 5/2008  | Witzel et al. .............. 370/352 |
| 2008/0310392 | A1 | * | 12/2008 | Dowling et al. ........... 370/349 |
| 2008/0310397 | A1 | * | 12/2008 | Hu et al. ................... 370/352 |
| 2009/0052438 | A1 | * | 2/2009  | Zhu et al. ................. 370/352 |
| 2009/0067592 | A1 | * | 3/2009  | Morris .................... 379/88.17 |

FOREIGN PATENT DOCUMENTS

| GB | 2 405 768       | 3/2005 |
| JP | 02181541 A      | 7/1990 |
| WO | WO-02/071721 A1 | 9/2002 |
| WO | WO-2004/073241 A2 | 8/2004 |

OTHER PUBLICATIONS

3GPP TS 22.228 V6.7.0 (Jan. 2005); *Technical Specification;;* 3rd Generation Partnership Project; Technical Specification Group Services and System Aspects: Service requirements for the Internet Protocol (IP) multimedia core network subsystem: Stage 1 (Release 6).

(Continued)

*Primary Examiner* — Robert Scheibel
*Assistant Examiner* — Saba Tsegaye
(74) *Attorney, Agent, or Firm* — Dickstein Shapiro LLP

(57) ABSTRACT

Method for transmitting supplementary data whose content relates to a communication session which has been set up or terminated to a communication terminal, in which a message is generated which contains the supplementary data and which has an identification for the communication session, and the message is transmitted to the communication terminal.

15 Claims, 3 Drawing Sheets

OTHER PUBLICATIONS

3GPP TS 23.228 V6.8.0 (Dec. 2004); *Technical Specification*; 3rd Generation Partnership; Technical Specification Group Services and System Aspects; IP Multimedia Subsystem (IMS); Stage 2 (Release 6).

IETF, RFC: 791; "Internet Protocol"; Sep. 1981.

Open Mobile Alliance; "Multimedia Messaging Service Encapsulation Protocol; Candidate Version 1.3—Sep. 27, 2005"; OMA-TS-MMS-ENC-V1_3-20050927-C.

IETF, RFC 822; "Standard for the format of ARPA Internet Text Messages"; Aug. 1982.

IETF, RFC 3261; "SIP: Session Initiation Protocol"; Jun. 2002.

\* cited by examiner

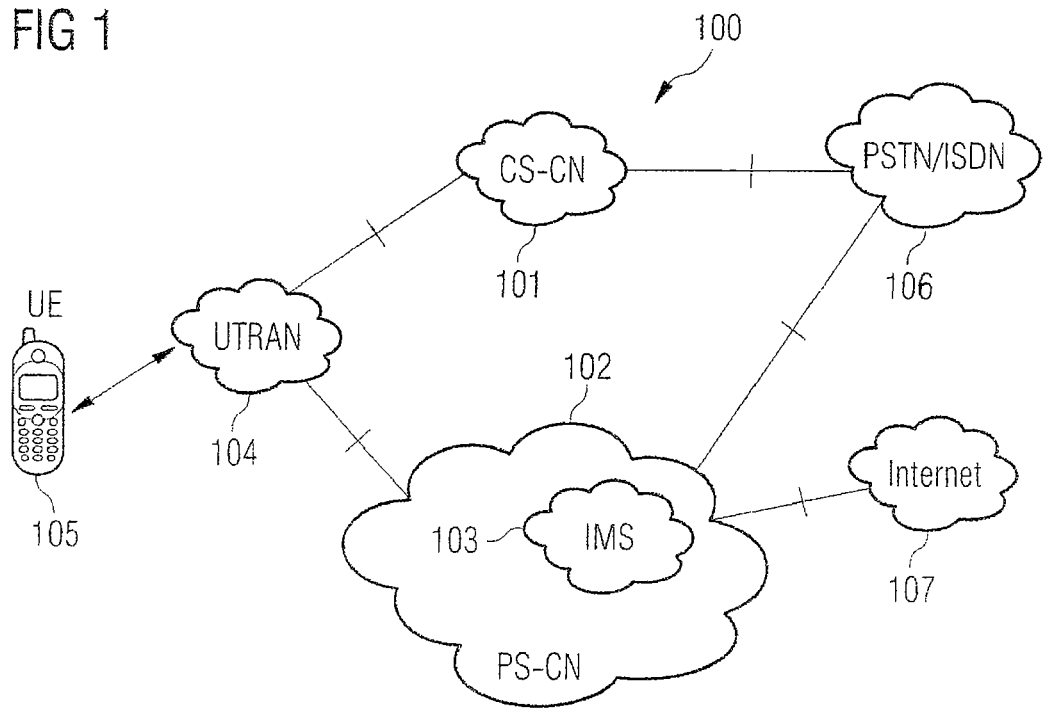
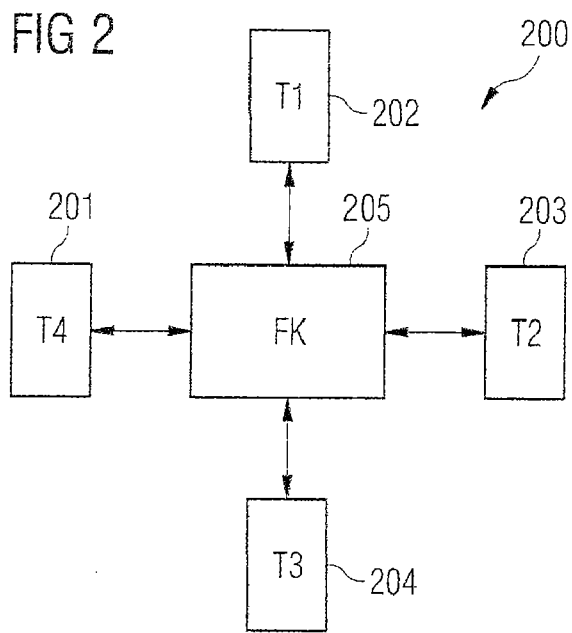

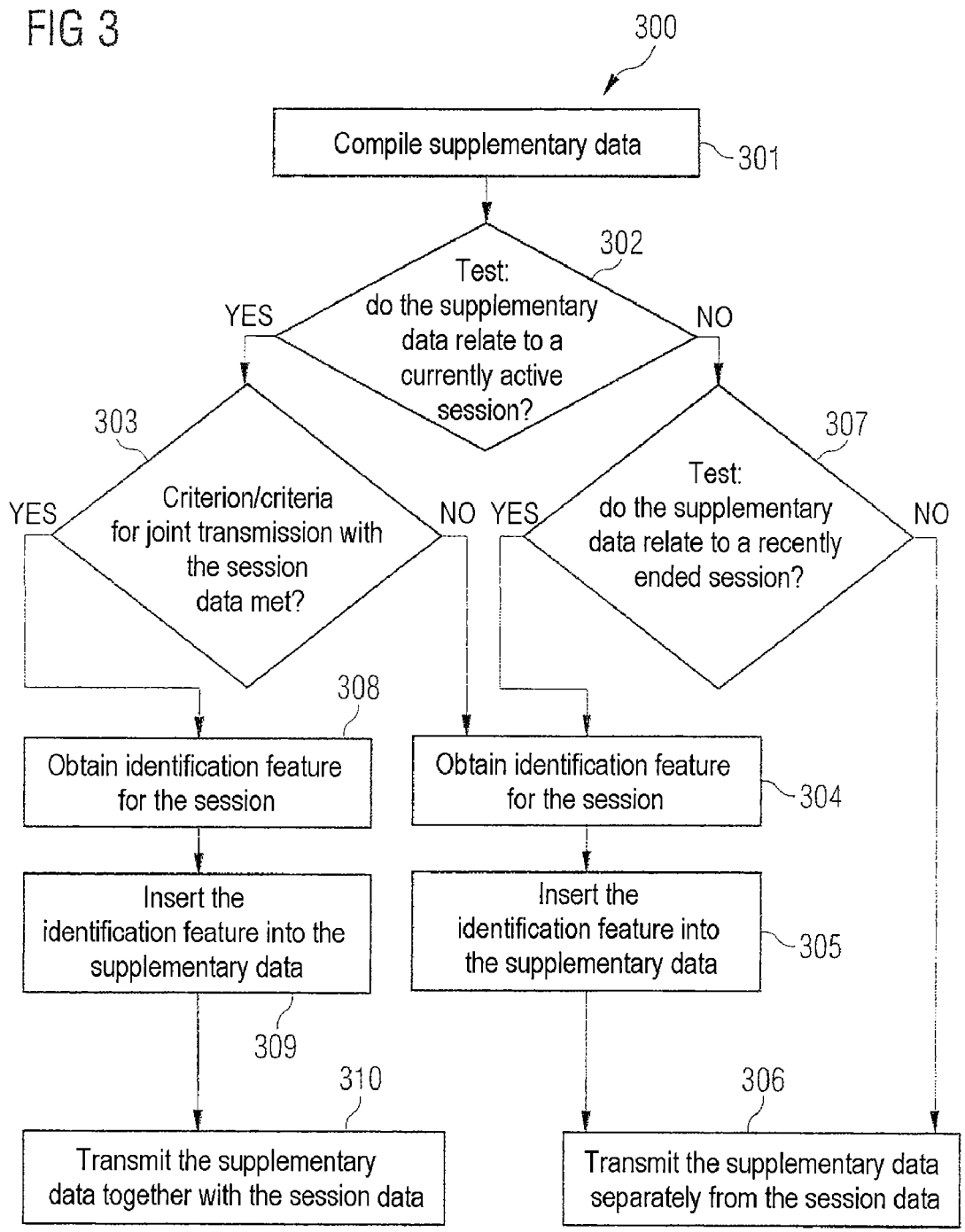

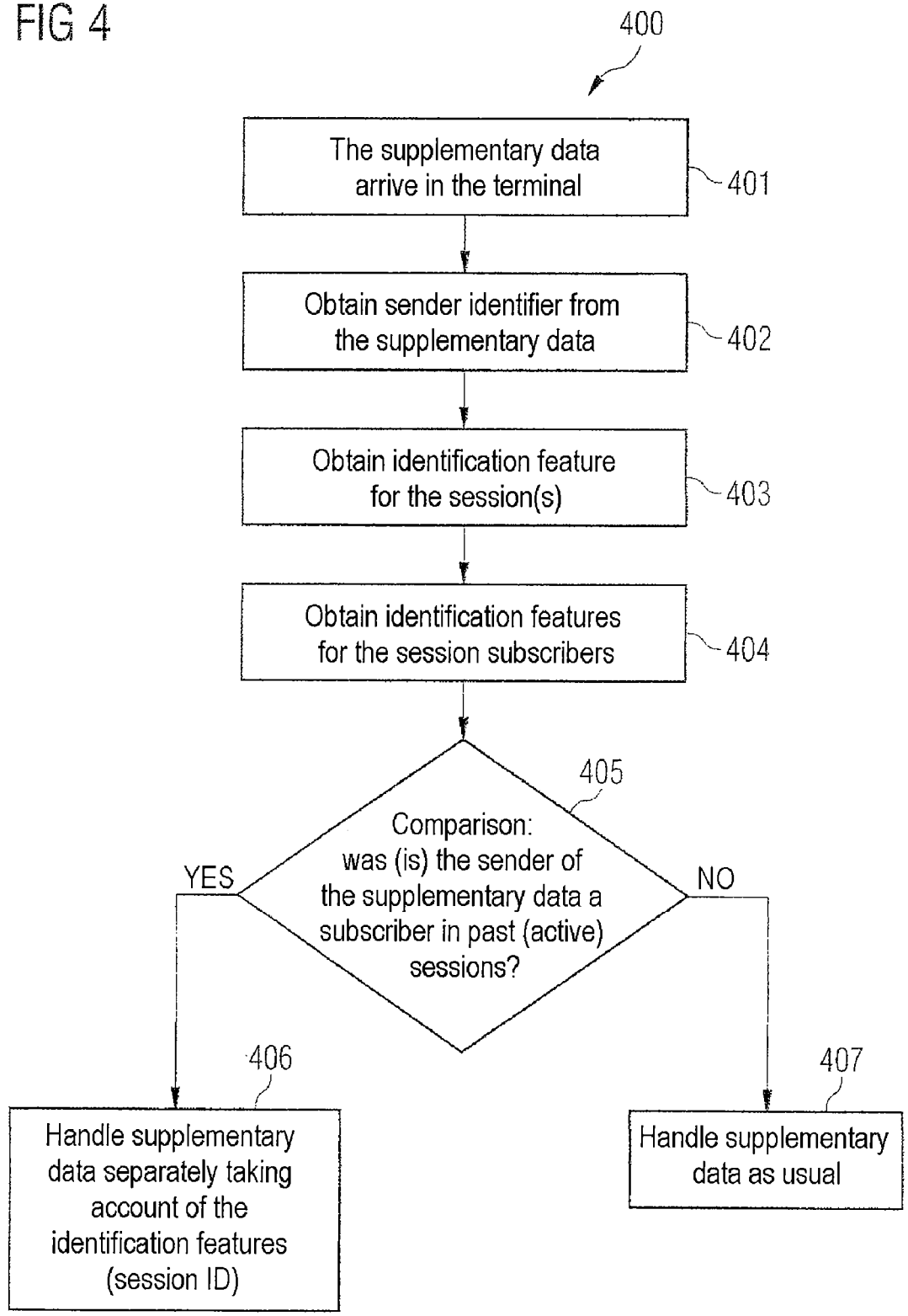

METHOD AND SYSTEM FOR TRANSMITTING SUPPLEMENTARY DATA, AND COMMUNICATION TERMINAL

CROSS-REFERENCE TO RELATED APPLICATION

This application claims priority to German Patent Application Serial No. 10 2006 001 503.7, which was filed Jan. 11, 2006, and which is incorporated herein by reference in its entirety.

BACKGROUND

The invention relates to a method and a system for transmitting supplementary data and to a communication terminal.

During a communication session, for example during a telephone call or an IM (Instant Messaging) session, the situation may arise in which a subscriber in the communication session wishes to interchange additional data with one or more of the other subscribers which (data) have content accompanying the communication session but which cannot be interchanged in the course of the communication session, for example image data in the course of a voice conference.

BRIEF DESCRIPTION OF THE FIGURES

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a communication system based on an exemplary embodiment of the invention.

FIG. 2 shows a conference communication system based on an exemplary embodiment of the invention.

FIG. 3 shows a flowchart based on an exemplary embodiment of the invention.

FIG. 4 shows a flowchart based on an exemplary embodiment of the invention.

DESCRIPTION OF THE INVENTION

In modern mobile radio communication systems, communication services, particularly realtime communication services, are provided using the IP-based multimedia subsystem (IMS). The IMS, as the name suggests, is based on the Internet protocol (IP).

The IMS can be regarded as a session control and service delivery platform which allow various multimedia applications and communication services to be provided for mobile subscriber terminals (or their user) and, through planned expansion of the IMS to PSTNs (Public Switched Telephone Networks), in future also for fixed subscriber terminals.

The use of various media types such as voice data, image data, etc., in conjunction with a combination of telecommunication services and data transmission services allows data interchange between the subscriber terminals (or their users) which is much more multifaceted and "more natural" than was able to be provided using conventional communication services and communication systems.

Already standardized applications which are based on the IMS are the communication services Instant Messaging (IM), Presence, Availability and Group Management (PAG) and Push-to-Talk over Cellular (PoC).

The IMS affords the following advantages:
simple integration of various communication services with various media types and communication service elements, such as voice data, music data, image data, video data, browser applications, etc.;
through multimedia calls, which allow a voice call with additional transmission of video images or a video conference with additional image presentation, for example;
through enhanced call management, which allows the use of presence services, for example;
simple integration of new services into a telecommunication network for cross-sectional functionalities such as tariffing, billing, security, authentication, etc.;
the possibility of rapid development of new services and applications for the IMS;
standard personalization and a standard appearance for the provided services despite various possibilities for access (multiple access) to the IMS, for example using a GSM (Global System for Mobile Communications) mobile radio network, a UMTS (Universal Mobile Telecommunications System) mobile radio network, a GPRS (General Packet Radio Service) communication system, an EDGE (Enhanced Data Rates for GSM Evolution) communication system, using a WLAN (Wireless Local Area Network), using DSL (Digital Subscriber Line), etc.

The aforementioned communication services provided by means of the IMS, particularly Push-to-Talk over Cellular (PoC), are becoming ever more popular. The situation frequently arises in which a subscriber in a communication session, for example a PoC session or an IM session, wishes to interchange additional data with one or more of the other subscribers which (data) have content to accompany the communication session but cannot be interchanged in the course of the communication session, for example image data in the course of a voice conference.

A few examples of possible instances of application of this kind are described below.

During a PoC session in which the subscribers in the PoC session are discussing a technical subject, one subscriber wishes to transmit a sketch to the other subscribers illustrating the technical context in order to improve understanding. When the PoC session has ended, the subscriber sends an e-mail containing the sketch to the other subscribers.

In the case of a packet switched telephone call (VoIP session, Voice over IP session) between two acquaintances, one of the subscribers asks the other subscriber for the URL (Uniform Resource Locator), that is to say the www (World Wide Web) address, of his homepage in the course of the telephone call. Since the special characters it contains make the URL relatively difficult to give without error during a telephone call, the person being asked prefers to transmit the URL to his acquaintance using an SMS (Short Message Service) message when the telephone call has ended.

In the case of an IM (Instant Messaging) session in which the subscribers are discussing the subject "dentists", one of the subscribers, who has had particularly good experiences with his dentist, wishes to send the other subscribers the address of his dentist in the form of a vCard (that is to say an electronic visiting card). To do this, while the IM session is still in progress, he starts an application on the communication terminal he is using which allows multimedia messages, for example MMS (Multimedia Messaging Service) messages, to be sent and sends his dentist's vCard in the form of a multimedia message (MM) to the other subscribers in the IM session.

In all of the examples described above, subscribers receive a self-contained data packet (in the above cases an e-mail, an SMS message and an MMS message) containing supplementary information whose content relates to the communication session during or (shortly) after termination of a communication session.

The transmission of supplementary data whose content relates to a communication session on the basis of conventional procedures has the following drawbacks:

The supplementary data are typically transmitted to the recipient(s) using different logical paths and/or physical paths, for example on the basis of different communication protocols and/or using different transmission paths or different network elements, than the media data transmitted in the course of the communication session and separately from these data. In addition, their properties, for example their formatting, mean that they are typically handled in a receiving communication terminal such that it is not possible for the user to see a relationship with the communication session. By way of example, an e-mail whose content relates to a communication session is stored in an incoming mail folder which is not connected to the communication session or the supplementary data are displayed using a different application than the media data transmitted in the course of the communication session, etc.

In particular, it is not possible for a subscriber receiving data to see that these data relate to a communication session if the data are not transmitted during or shortly after the communication session or the transmitting subscriber provides insufficient information about the relationship between the content of the data he has sent and the communication session. If the transmitting subscriber sends the data in the form of an e-mail with the subject line "Our Telephone Call", for example, then it may be difficult for the receiving subscriber to make the connection with the telephone call, particularly if the e-mail is not sent until some time after the telephone call has ended.

Whereas it may make sense to transmit supplementary data whose content relates to a communication session using different logical transmission paths and/or physical transmission paths than the transmission of the media data transmitted in the course of the communication session with large volumes of data (such as in the above example, in which a sketch is transmitted, which has a size of several kilobytes, for example), this is not efficient if the volume of data in the supplementary data is relatively small (as in the case of the above example, in which the supplementary data comprise just a URL, which has a size of only a few bytes).

In line with one exemplary embodiment of the invention, a user-friendly expansion of the communication options in the course of a communication session is provided.

In line with an exemplary embodiment of the invention, a method for transmitting supplementary data whose content relates to a communication session which has been set up or terminated to a communication terminal is provided, in which a message is generated which contains the supplementary data and which has an identification for the communication session, and the message is transmitted to the communication terminal.

In addition, in line with an exemplary embodiment of the invention, a system for transmitting supplementary data in line with the above-described method for transmitting supplementary data is provided.

In addition, in line with an exemplary embodiment of the invention, a communication terminal is provided which has a reception device which is set up to receive a message containing supplementary data whose content relates to a communication session which has been set up or terminated and having an identification for the communication session and which has an ascertainment device which is set up to ascertain the identification from the message.

The communication terminal may also have a display device which is set up to display the content association between a message and a currently set-up or terminated communication session to the user explicitly.

Clearly, supplementary data whose content relates to a communication session which is currently taking place or has taken place and which are sent are characterized in that they can be associated with the communication session.

In this way, the communication terminal can easily establish whether data which it receives have a content which relates to a communication session which is currently taking place or has taken place. If received data relate to a communication session in which a user is taking part using the communication terminal, for example, then the communication terminal can indicate this to the user.

The communication terminal may contain a checking unit which, for data received by the communication terminal, checks whether these data relate to a communication session and, if appropriate, associates them with the communication session. This does not require any standardization of the identifier for the supplementary data.

Clearly, exemplary embodiments of the invention allow the relationship between supplementary data whose content relates to a communication session and the communication session not to be lost and to be able to be restored in the receiving communication terminal.

In an exemplary embodiment of the invention, supplementary data whose content relates to a communication session are understood to mean data whose content is associated with the correspondence which is taking place or took place in the course of the communication session. In particular, they are understood to mean information which a subscriber in the communication session wishes to communicate to at least one other subscriber in the communication session and which relates to the correspondence between the subscriber and the at least one other subscriber in the course of the communication session. By way of example, this is supplementary information relating to a subject which the subscriber and the at least one other subscriber have discussed in the course of the communication session. The supplementary data cannot be transmitted in the course of the communication session, for example, because they are of a different type than the media data interchanged in the course of the communication session. By way of example, the supplementary data are a digital image and the communication session is a telephone call, which only allows the interchange of voice data.

The supplementary data may be voice data, video data, image data, text data and any other data.

The further embodiments of the invention which are described in connection with the method for transmitting supplementary data also apply, mutatis mutandis, to the system for transmitting supplementary data and to the communication terminal.

By way of example, a user uses the communication terminal to take part in the communication session or has taken part in the communication session using the communication terminal.

The message is generated using a further communication terminal, for example, and is transmitted from the further communication terminal to the communication terminal.

By way of example, a (further) user uses the further communication terminal to take part in the communication session or has taken part in the communication session using the further communication terminal.

In an embodiment, a decision is made regarding whether the supplementary data are to be transmitted to the communication terminal using a transmission path which is also used to transmit data which are transmitted to the communication terminal in the course of the communication session, or whether the supplementary data are to be transmitted to the communication terminal using another transmission path.

On the basis of the decision, the message can be generated and transmitted to the communication terminal.

Transmitting the message to the communication terminal using a transmission path which is also used to transmit data which are transmitted to the communication terminal in the course of the communication session may be advantageous if the message is relatively small. By way of example, if the message is relatively small, it can be transmitted together with the signaling data which are transmitted to the communication terminal in the course of control of the communication session.

By way of example, the communication terminal is a mobile radio subscriber terminal and the message is transmitted to the communication terminal using a mobile radio communication network.

The communication session is provided by means of an IMS (Internet protocol-based Multimedia Subsystem), for example, or has been provided by means of an IMS.

Communication sessions provided by means of an IMS are becoming increasingly important and, in particular, have the advantage that they have a distinct identification feature, for example a communication session identification statement in the form of a session ID.

The communication session may be PoC (Push-to-Talk over Cellular) communication session, an IM (Instant Messaging) communication session or a VoIP (Voice over Internet Protocol) session, for example.

The message may be an SMS (Short Message Service) message, an MMS (Multimedia Message Service) message or an e-mail, for example.

In an embodiment of the invention, a communication session may be understood to mean an interchange of data, terminated on the basis of time, using a logical connection in a communication system between at least two addressable units in the communication system. In particular, the term communication session, as used below, includes VoIP telephone calls provided by means of the packet switched part (PS domain) of a mobile radio network. In addition, the term communication session, as used below, is not limited to communication services provided by means of the IMS. In particular, the term communication session includes conventional telephone calls provided by means of the circuit switched part (CS-CN: Circuit Switched Core Network) of a telecommunication network.

FIG. 1 shows a mobile radio communication system 100 based on an exemplary embodiment of the invention.

The mobile radio communication system 100 has a circuit switched subnetwork 101 (CS-CN: Circuit Switched Core Network) and a packet switched subnetwork 102 (PS-CN: Packet Switched Core Network). An IMS (Internet protocol-based Multimedia Subsystem) 103 is part of the packet switched subnetwork 102 and can be regarded as a signaling network which is located, in other words operates, in the background of the packet switched subnetwork 102. In this example, the mobile radio communication system 100 is a UMTS communication system, that is to say a mobile radio communication system based on the UMTS (Universal Mobile Telecommunications System) standard, and has a radio access network 104, which in the case of UMTS is called UTRAN (UMTS Terrestrial Radio Access Network).

Using a mobile radio subscriber terminal 105, which in the case of UMTS is called UE (User Equipment), a user can use both communication connections provided using the circuit switched subnetwork 101 (clearly in a "classical" manner) and communication connections provided using the packet switched subnetwork 102 (clearly in a "modern" manner). The circuit switched subnetwork 101 and the packet switched subnetwork 102 are parts of the core network in the mobile radio communication system. Signaling data and useful data are received and transmitted by the mobile radio subscriber terminal 105 using the radio access network 104.

The communication system 100 also has the "normal" circuit switched fixed telephone network 106. The name PSTN (Public Switched Telephone Network) for the fixed telephone network 106 is since outmoded, because the ISDN (Integrated Services Digital Network) communication network which is predominant in Europe can be used to provide not only telephony but also other communication services (such as fax and remote data transmission), and the fixed telephone network 106, which in this exemplary embodiment also supports ISDN, is therefore not a pure telephone network. The communication system 100 also has the Internet 107, which is a world-wide fixed communication network and which is formed by communication networks which are independent of one another. In principle, all computers coupled to the Internet can communicate with one another. The computers communicate on the basis of protocols, for example the IP (Internet Protocol), which corresponds to a protocol from the 3rd layer in the OSI (Open System Interconnection) reference model, and the TCP (Transport Control Protocol), which corresponds to a protocol from the 4th layer in the OSI reference model.

FIG. 2 shows a conference communication system 200 based on an exemplary embodiment of the invention.

A plurality of communication terminals 201, 202, 203, 204 used by conference subscribers communicate using a central unit, a conference focus 205. The conference focus 205 is used to provide a conference in which the conference subscribers take part. The conference focus 205 is addressed using a conference address, which at the same time is the address of the provided conference.

The communication between the plurality of communication terminals 201, 202, 203, 204 and the conference focus 205 is carried out on the basis of the SIP (Session Initiation Protocol). The SIP is used for interchanging connection management messages (call control messages) between the conference focus 205 and the plurality of communication terminals 201, 202, 203, 204 in order to control the conference.

It is assumed that one of the subscribers in the conference, that is to say one of the users of the communication terminals 201, 202, 203, 204, wishes to transmit supplementary data whose content relates to the conference to at least one of the other subscribers during the conference or shortly (for example within a few hours or days) after the conference has ended. By way of example, in the case of a PoC communication session, one of the subscribers may wish to transmit a digital image with a sketch to the other subscribers, or after an IM communication session has ended one of the subscribers may wish to transmit a vCard to the other subscribers.

The exemplary embodiments of the invention are not limited to the use of conferences provided by means of a conference system as shown in FIG. 2. In particular, embodiments of the invention can also be used for the situation in which the communication session for which one of the subscribers wishes to transmit supplementary data whose content relates to the communication session to another subscriber is a telephone call. By way of example, following a telephone call with another user, a user may wish to transmit a URL (Uniform Resource Locator) to the other user as supplementary data whose content relates to the communication session, in this case the telephone call.

In the text below, it is assumed as an example that supplementary data are to be transmitted whose content relates to a conference which is (or has been) provided by means of the conference system 200 shown in FIG. 2.

In line with various embodiments of the invention, various procedures may be used for transmitting the supplementary data:

Separate transmission path: in this case, the supplementary data are transmitted on a different transmission path than the media data which are transmitted in the course of the conference (for example using other logical paths and/or physical paths, for example in line with other communication protocols and/or using other transmission paths, and/or with the involvement of other network elements). This is also called "media discontinuity". The transmitted supplementary data are provided with an identification feature which a communication terminal 201, 202, 203, 204 receiving the supplementary data can use to associate the supplementary data with the conference and to signal to the user of the communication terminal 201, 202, 203, 204 the relationship between the conference useful data, that is to say the media data which are (or have been) transmitted in the course of the conference, and the supplementary data.

Same transmission path: when the same transmission path is selected, the supplementary data are transported in the IMS protocol layer, which corresponds to the protocol on the basis of which the conference is provided. By way of example, the supplementary data are transmitted on the basis of the SIP (Session Initiation Protocol). This follows the general conceptional idea of the IMS 103, that just one service delivery platform is provided for different communication services, but strictly speaking may be regarded as an infringement of the IMS paradigm, on the basis of which IMS is understood to be a pure signaling network. However, this procedure has advantages particularly when the volume of data in the supplementary data is small, since the use of a separate transmission path is inefficient in the case of small volumes of data. In the case of this procedure too, the supplementary data can be provided with an identification feature which allows the supplementary data to be associated with the conference.

Use of a decision making unit for selecting the transmission path: a decision making unit may be provided which decides how the supplementary data are transmitted, for example using the aforementioned options of a separate transmission path or of the same transmission path. This decision is made on the basis of certain criteria, such as type of supplementary data (file type or file format for the supplementary data) or the volume of data in the supplementary data. The decision making unit can make the decision independently or can indicate to the subscriber wishing to send the supplementary data a proposal for the transmission path, for example optically or audibly.

Optionally, the identification feature with which the transmitted supplementary data are provided may also comprise, in addition to the information which can be used to refer to a particular session, information which can be used to refer to individual communication terminals, or their users, and information which comprises advice and/or references about how—for example at the reception end—a link can be established between two different addressing types. The latter is particularly useful when two communication terminals, or their users, are addressed in different transmission systems (for example VoIP telephone call and e-mail) in different ways (for example using a telephone number in the first transmission system and using an e-mail address in the second transmission system).

In an embodiment, when the supplementary data are received in the receiving communication terminal 201, 202, 203, 204, a check is performed to determine whether the supplementary data have a content reference to a conference which is taking place or which has recently ended. This can be done automatically, for example on the basis of an address for the communication terminal 201, 202, 203, 204 which has been used to send the supplementary data, or the user of the communication terminal 201, 202, 203, 204 can be asked whether received supplementary data are connected to a conference which is taking place or which has ended recently, or the checking unit automatically makes a decision and indicates it to the user for confirmation.

The text below makes reference to FIG. 3 to explain a sequence for an exemplary embodiment in which a decision making unit is provided which decides what transmission path is used to transmit supplementary data whose content relates to a communication session which is taking place or which has already ended.

FIG. 3 shows a flowchart 300 based on an exemplary embodiment of the invention.

In this example, the communication session is a PoC session relating to the subject of holidays which is operated, that is to say has been initiated, by a user. It is assumed that the user wishes to transmit a digital holiday image from his last holiday to another subscriber in the PoC session.

At 301, the supplementary data are compiled, in this case the holiday image which is to be sent. To this end, the user selects the holiday image, which is stored on his mobile radio subscriber terminal which he is using to take part in the PoC session, for example, and also writes a short explanatory text for it. Using an editor (or any application which allows messages to be compiled) installed on the mobile radio subscriber terminal, a MIME (Multipurpose Internet Mail Extension) multipart construct containing the supplementary data, that is to say the digital holiday image and the short explanatory text, is generated.

At 302, a check is performed to determine whether the content of the data which are to be sent relates to a communication session which is taking place. Since this is the case and is accordingly input into the mobile radio subscriber terminal by the user, for example, the procedure continues at 303.

At 303, the decision making unit to which the MIME multipart construct is transferred uses the type of data contained in the MIME multipart construct and uses the total data volume of the MIME multipart construct to decide whether a separate transmission path is used or whether the supplementary data are transmitted on the same transmission path as data which are transmitted in the course of the communication session. This may also take account of preferences specified by the user. By way of example, the user may have indicated that supplementary data whose content relates to PoC sessions are always transmitted in the form of a multimedia message or may have indicated that supplementary data whose content relates to an IM communication session and which are to be transmitted to a particular receiver are never transmitted in the form of an e-mail.

In this exemplary embodiment, it is assumed that the decision making unit takes the volume of data which is to be sent as a basis for deciding that the supplementary data are transmitted in the form of an MMS message. On the basis of this decision, the sequence is continued at 304.

At 304, an identification feature for the PoC session is determined. In this example, this is the session ID for the PoC session.

At 305, the supplementary data are provided with the identification feature. In this example, the session ID is inserted into an MMS message which is used to transmit the supplementary data on the basis of the decision by the decision making unit. An MMS message is also called an OMA (Open Mobile Alliance) MMS PDU (Packet Data Unit). An MMS message has at least one header field with an associated field value. Besides specific header fields for the MMS, an MMS message may also have standard RFC 822 header fields. The order in which an MMS message contains header fields is arbitrary in principle, but the following three header fields should appear at the start of an MMS message if the MMS message actually contains them:

X-Mms Message Type; this header field indicates the type of MMS message

X-Mms Transaction ID; can be used to indicate the association between the MMS message and another MMS message X-Mms MMS Version; indicates the version of the MMS according to which the MMS message is formed.

The MMS message used to send the supplementary data in this exemplary embodiment is shown in Table 1.

TABLE 1

X-Mmms-Message-Type: m-send-req
X-Mms-Transaction-ID: TRANSACTION-ID#1
X-Mms-Version: 1.3
Date: Fri, 26 Aug 2005 18:03:00 +0100
From: UserA@infineon.de
To: UserB@infineon.de
Subject: Spiekeroog
X-Mms-Delivery-Report: Yes
X-Mms-Related-Session: sip:session0231@poc-server.provider_xy.com
Content-Type: Application/vnd.wap.multipart.related
nEntries: 2
HeadersLen: XX
DataLen: XX
Content-Type: text/plain;
X-Mms-Content-ID: <000334.1412.1UserA>
Hello UserB,
as requested, I have attached to this MM a holiday photo of me and the link to the homepage of Spiekeroog, to give you a real taster.
http://www.spiekeroog.de
Have fun at work ;-)
Regards
UserA
HeadersLen: XX
DataLen: XX
Content-Type: image/jpeg
X-Mms-Content-ID: <00334.1412.2UserA>
...

The MMS message shown in Table 1 is an M-Send.req OMA MMS PDU, which is extended over a conventional MMS message (in line with 305) by a header field for indicating the identification feature.

As mentioned, the identification feature in this exemplary embodiment is the session ID for the PoC session and is held in the header field X-Mms Related Session of the MMS message shown in Table 1 (see row 9 in Table 1, which is also highlighted by bold type). In this example, the identification feature has just one part for specifying the provider of the communication service (poc-server.provider_xy.com) and also a number for the PoC session (Session 0231). However, the identification feature may also have three or more parts, for example respectively an identifier for the provider of the communication service (that is to say the service provider), a part for identifying the communication session, for example a session number, an identification for the user who is sending the MMS message or who has initiated the communication session or is conducting it and an identification for the communication terminal used by this user, etc.

The MMS message containing the supplementary data and the identification feature is sent at 306. Using the identification feature, the communication terminal used by one of the subscribers who has been sent the MMS message can establish the relationship with the PoC session. The communication terminal can process the supplementary data contained in the MMS message separately. By way of example, the MMS message can be stored in a specific incoming folder and/or can be displayed in a special way, for example identified by a specific symbol (icon) or marked especially using color.

If 302 establishes that the content of data to be sent does not relate to a communication session which is taking place then a check is performed at 307 to determine whether the content of the data to be sent relates to a communication session which has recently ended. If this is the case, then the procedure continues at 304. If this is not the case, then the data to be sent are sent at 306 without further special measures, particularly without an identification feature for a communication session.

As described above, at 303 the decision making unit takes the relatively large volume of data which is to be sent as a basis for deciding that the supplementary data are sent using a separate transmission path, in this case using an MMS message. If the volume of data in the supplementary data which are to be sent is relatively small, however, for example if the user wishes to send only the indication of a URL, which typically comprises just a few bytes, then the decision making unit may decide that the supplementary data are sent not on a separate transmission path but rather on the same transmission path as data which are transmitted in the course of the PoC session. In a similar manner to 304, an identification feature for the PoC session is also determined in this case at 308, and at 309 the supplementary data are provided with the identification feature.

The supplementary data are then transmitted at 310 on a transmission path which is also used to transmit data in the course of the PoC session. By way of example, the supplementary data may be transmitted in data containers for a particular type of SIP messages in the IMS protocol layer. Since data for controlling the PoC session are likewise transmitted using SIP messages in the IMS protocol layer, this is a transmission path which is also used for data which are sent in the course of the PoC session (in this case to control the PoC session). The useful data in the PoC session, that is to say the media data, for example voice data, are transmitted not on the basis of the SIP but rather on the basis of another protocol suitable for this purpose.

The decisions to be made at 302, 303 and 307 may also be confirmed by the user. By way of example, the user may be asked by his communication terminal whether the supplementary data are transmitted in the form of an MMS message or whether the supplementary data relate to the PoC session.

If the supplementary data are transmitted, in line with 310, on the same transmission path as data sent in the course of the PoC session, then providing the supplementary data with an identification feature may also merely involve them being sent on the same transmission path as the data transmitted in the course of the PoC session, for example, so that it is possible to tell that they are associated with the PoC session. Clearly, it is in this case possible to see the association on the basis of the transmission path used, for example in the case of a circuit switched communication session. 308 and 309 could be omitted in such a case.

The text below refers to FIG. 4 to describe an exemplary embodiment in which a communication terminal contains a checking unit which, for data received by the communication terminal, for example for all MMS messages and SMS messages received by the communication terminal, checks whether the data are supplementary data which relate to a communication session taking place or (recently) ended in which the communication terminal (or the user of the communication terminal) is taking part or has taken part.

FIG. 4 shows a flowchart 400 based on an exemplary embodiment of the invention.

At 401, the communication terminal receives data, in this exemplary embodiment in the form of an SMS message.

At 402, the communication terminal ascertains the sender of the data. In this example, an identification for the sender of the SMS message is ascertained from the SMS message in the form of a MSISDN (Mobile Subscriber Integrated Service Digital Network Number).

At 403, identification features for the communication sessions which are currently taking place or (recently) ended communication sessions in which the communication terminal is taking part or has taken part are ascertained. By way of example, these identification features may be stored in the form of a list in the communication terminal and this list may be regularly updated. By way of example, an identification feature for a communication session in which the communication terminal has taken part is removed from the list if the communication session was already terminated some time ago (for example a few days ago) and hence it is no longer to be expected that supplementary data whose content relates to the communication session are sent to the communication terminal. The period of time after which such a communication session is removed from the list (or its identification feature is removed from the list) after it has ended can be set by the user of the communication terminal, for example.

At 404, in a similar manner to 403, identification features for subscribers in communication sessions in which the communication terminal is taking part or has (recently) taken part are ascertained. The identification features for these subscribers may likewise be in the form of a list in the communication terminal which is regularly updated.

The identification features for the session subscribers for a communication session which is taking place or has ended can be ascertained, by way of example, by setting up a communication connection between the communication terminal and the server computer which is providing or has provided the communication session and by virtue of the communication terminal requesting a subscriber list for the communication session from the server computer.

At 405, the checking unit checks whether the content of the data received by the communication terminal relates to a communication session which is taking place or has (recently) ended in which the communication terminal is taking part or has taken part. To this end, the checking unit compares the identification of the sender of the SMS message, obtained at 402, with the identification features of communication sessions ascertained at 403.

If one of the identification features for the communication sessions allows an association with the sender of the SMS message, for example a three-part identification feature which has a number for the relevant communication session, an identification for the provider of the communication session and a sender identifier, and takes the form sip:c8oqz84zk7z@domain.org;tag=hyh8, for example, as a result of this comparison, then the sequence is continued at 406.

If the checking unit cannot establish a link between the sender of the SMS message and the communication sessions on the basis of the identification features for the communication sessions, for example because all the identification features of the communication sessions are in just two parts in the form of an identification for the relevant communication session and an identification for the provider of the communication session (that is to say the communication service provider), for example in the form sip:session5647@provider.org, then the checking unit compares the identification of the sender of the SMS message, ascertained at 402, with the identification features of session subscribers ascertained at 404.

If the checking unit establishes in this way that the sender of the SMS message matches a subscriber in a communication session which is taking place or has (recently) ended in which the communication terminal is taking part or has taken part then the sequence is likewise continued at 406.

At 406, the received data are processed in a special way in line with the link to a communication session, for example are displayed to the user of the communication terminal in a special way, for example with the indication that the received data relate to a particular communication session.

If the checking unit does not establish at 405 that the received data are supplementary data whose content relates to a communication session taking place or (recently) ended in which the communication terminal is taking part or has taken part then the sequence is continued at 407 and the received data are not processed separately, for example the SMS message is displayed normally.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for transmitting supplementary data to a communication terminal, comprising:
   providing a communication session, wherein the communication terminal is a subscriber of the communication session;
   generating a message containing supplementary data whose content relates to the communication session that has been set up or terminated and an identification for the communication session;
   transmitting the message to the communication terminal, wherein the supplementary data cannot be transmitted in the course of the communication session, and wherein the communication session is configured such that the communication terminal cannot receive the supplementary data in the course of the communication session; and deciding, based at least in part on the volume of data in the supplementary data, whether the supplementary data is to be transmitted to the communication terminal using the same transmission path used to transmit data to the communication terminal in the course of the communication session, or whether the supplementary data is to be transmitted to the communication terminal using another transmission path.

2. The method as claimed in claim 1, wherein a user takes part or has taken part in the communication session using the communication terminal.

3. The method as claimed in claim 1, wherein the message is generated using a further communication terminal and is transmitted from the further communication terminal to the communication terminal.

4. The method as claimed in claim 3, wherein a user takes part or has taken part in the communication session using the further communication terminal.

5. The method as claimed in claim 1, wherein the decision is based on the volume of the supplementary data.

6. The method as claimed in claim 1, wherein the decision is used as a basis for generating the message and transmitting the message to the communication terminal.

7. The method as claimed in claim 1, wherein the communication terminal is a mobile radio subscriber terminal and the message is transmitted to the communication terminal using a mobile radio communication network.

8. The method as claimed in claim 1, wherein the communication session is provided or has been provided using an IMS.

9. The method as claimed in claim 1, wherein the communication session is a PoC communication session, an IM communication session or a VoIP session.

10. The method as claimed in claim 1, wherein the message is an SMS message, an MMS message or an e-mail.

11. A system for transmitting supplementary data to a communication terminal, comprising:

a communication session, wherein the communication terminal is a subscriber of the communication session;

a message generation device that generates a message containing the supplementary data whose content relates to the communication session that has been set up or terminated and an identification for the communication session;

a transmission device transmitting the message to the communication terminal, wherein the supplementary data cannot be transmitted in the course of the communication session, and wherein the communication session is configured such that the communication terminal cannot receive the data in the course of the communication session; and a decision making unit that decides, based at least in part on the volume of data in the supplementary data, whether the supplementary data is transmitted to the communication terminal using the same transmission path used to transmit data to the communication terminal in the course of the communication session, or whether the supplementary data is to be transmitted to the communication terminal using another transmission path.

12. The system as claimed in claim 11, wherein the decision is based on the volume of the supplementary data.

13. A method for transmitting supplementary data to a mobile radio subscriber terminal, comprising:

providing a communication session, wherein the mobile radio subscriber terminal is a subscriber of the communication session;

generating a message containing supplementary data whose content relates to the communication session that has been set up or terminated and an identification for the communication session;

transmitting the message to the mobile radio subscriber terminal using a mobile radio communication network, wherein the supplementary data cannot be transmitted in the course of the communication session, and wherein the communication session is configured such that the mobile radio subscriber terminal cannot receive the data in the course of the communication session; and deciding, based at least in part on the volume of data in the supplementary data, whether the supplementary data is to be transmitted to the mobile radio subscriber terminal using the same transmission path used to transmit data transmitted to the mobile radio subscriber terminal in the course of the communication session, or whether the supplementary data is to be transmitted to the mobile radio subscriber terminal using another transmission path.

14. A method for transmitting supplementary data to a communication terminal, comprising:

a communication session, wherein the communication terminal is a subscriber of the communication session;

deciding, based at least in part on the volume of data in the supplementary data, whether supplementary data whose content relates to a communication session that has been set up or terminated are to be transmitted to the communication terminal using the same transmission path used to transmit data transmitted to the communication terminal in the course of the communication session, or whether the supplementary data is to be transmitted to the communication terminal using another transmission path;

generating a message which contains the supplementary data and an identification for the communication session on the basis of the decision; and transmitting the message to the communication terminal on the transmission path or the another transmission path on the basis of the decision.

15. The method of claim 14, wherein the decision is made on the basis of certain criteria being fulfilled.

* * * * *